United States Patent
Moriya

(10) Patent No.: US 7,605,894 B2
(45) Date of Patent: *Oct. 20, 2009

(54) PHASE DIFFERENCE CONTROL COMPONENT HAVING COLUMNAR MATERIAL

(75) Inventor: Norihisa Moriya, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 11/670,421

(22) Filed: Feb. 2, 2007

(65) Prior Publication Data

US 2008/0278662 A1    Nov. 13, 2008

Related U.S. Application Data

(62) Division of application No. 10/864,307, filed on Jun. 8, 2004, now Pat. No. 7,286,199.

(30) Foreign Application Priority Data

Jun. 10, 2003  (JP) ................................ 164527

(51) Int. Cl.
  *G02F 1/13363* (2006.01)
  *G02F 1/1339* (2006.01)
(52) U.S. Cl. ................ 349/117; 349/106; 349/156
(58) Field of Classification Search .............. 349/106, 349/117, 123, 143, 155, 156; 428/1.1, 1.3
See application file for complete search history.

(56) References Cited

U.S. PATENT DOCUMENTS

| 6,067,138 A | 5/2000 | Nishiguchi et al. |
| 2003/0071959 A1* | 4/2003 | Koyama ............... 349/156 |

FOREIGN PATENT DOCUMENTS

JP    7-28068    1/1995

* cited by examiner

*Primary Examiner*—Dung Nguyen
*Assistant Examiner*—Tai Duong
(74) *Attorney, Agent, or Firm*—patenttm.us

(57) ABSTRACT

The invention has for its object the provision of a phase difference control component that, albeit comprising a phase difference control layer formed of a polymerizable liquid crystal, enables a given spacing to be maintained between opposite substrates, etc. A phase difference control component 1 comprises a multilayer structure wherein a phase difference control layer 3 formed of a liquid crystal polymer is stacked on a substrate 2, and a plurality of prismatic, cylindrical or other columns is provided on the phase difference control layer 3. The columns are formed of a material obtained by curing an ionizing radiation-curable resin composition. With the multilayer structure, the object of the invention can be accomplished. A black matrix, a color filter layer or the like may be interposed between substrate 2 and phase difference control layer 3, and an electrode and an alignment film may be provided on the phase difference control layer.

6 Claims, 7 Drawing Sheets

PHASE DIFFERENCE CONTROL COMPONENT HAVING COLUMNAR MATERIAL

BACKGROUND OF THE INVENTION

The present invention relates to a phase difference control component that comprises a phase difference control layer capable of improving antireflection and viewing angle and that can keep the spacing between opposite substrates, etc. constant during assembly without recourse to any special means. The phase difference control component of the invention may be applied to various displays inclusive of liquid crystal displays and electro-luminescence displays.

Various types of displays are put to practical use, and, for the most part, are used in combination with retardation films for the purpose of improving antireflection and/or making viewing angles wide. For a typical retardation film, a retardation film (a negative C-plate) having its optical axis vertical to its substrate and negative double-refraction anisotropy and a retardation film (a positive A-plate) having its optical axis horizontal to its substrate and positive double-refraction anisotropy are used alone or in combination. For instance, see Patent Publication 1.

Currently available retardation films (herein referred to as phase difference control components) include a stretched polycarbonate or other film, and a triacetyl cellulose film on which a liquid crystal material having double-refraction anisotropy is coated. However, there are problems in connection with reflection of light at an adhesive layer used for laminating a retardation film onto a linear polarizing plate or laminating a multilayer structure onto a multilayer display. Moreover, the thickness of the phase difference control component itself is not that negligible. One possible approach to solving those problems involves lamination of a polymerizable polymer material onto one substrate that forms part of a display, thereby forming a phase difference control component. For instance, when substrates are combined together to set up a liquid crystal display, however, it is required to keep the spacing between the opposite substrate constant. For this reason, spacer particles such as silica particles are usually spotted over both substrates prior to lamination. For instance, see Patent Publication 2.

Patent Publication 1
JP(A)10-153802 (pp. 12-13, nd FIG. 54)
Patent Publication 2
JP(A)6-148654 (page 2)

However, one problem with the phase difference control component fabricated using a polymerizable liquid crystal is that its rigidity is not necessarily satisfactory. Another problem is that when the phase difference control component is located on the inside of a substrate, spacer particles come into spot contact with the phase difference control layer. Accordingly, as pressure is applied on the phase difference control layer, it tends to suffer from deformation enough large to permit spacer particles to engage therein. Thus, even when spacer particles having a constant particle diameter are used, it is often likely that the spacing between both substrates deviates from the diameter of the spacer particles; for instance, that spacing at the center of a display tends to become narrower than a given value.

SUMMARY OF THE INVENTION

It is thus the primary object of the invention to provide a phase difference control component that, albeit comprising a phase difference control layer formed of a polymerizable liquid crystal, enables a given spacing to be maintained between opposite substrates, etc.

As a result of the inventors' studies, it has been found that if a phase difference control component formed of a polymerizable liquid crystal is used in combination with substrate having a plurality of columns formed of a material obtained by curing an ultraviolet radiation-curable resin, it is then possible to provide a solution to the prior art problems. This finding underlies the invention.

According to the first aspect of the invention, there is provided a phase difference control component, characterized by comprising a substrate, a phase difference control layer and a plurality of columns, wherein said phase difference control layer is stacked on said substrate and comprises a liquid crystalline polymer, and said array of columns are provided on said phase difference control layer and formed of a material obtained by curing an ionizing radiation-curable resin composition.

According to the second aspect of the invention, the first phase difference control component of the invention is further characterized in that each column has a sectional area of 25 $\mu m^2$ to 2,500 $\mu m^2$ and a height of 0.5 μm to 10.0 μm.

According to the third aspect of the invention, the first or second phase difference control component of the invention is further characterized in that one column is provided per 1 to 27 pixels.

According to the fourth aspect of the invention, any one of the first to third phase difference control components is further characterized in that said phase difference control layer is provided for each pixel.

According to the fifth aspect of the invention, any one of the first to fourth phase difference control components is further characterized in that a color filter layer is interposed between said substrate and said phase difference control layer or on a side of said phase difference control layer that faces away from said substrate.

According to the sixth aspect of the invention, any one of the first to fifth phase difference control components is further characterized in that as viewed in order from said phase difference control layer on said substrate, a transparent electrode layer and an alignment film are stacked thereon.

According to the seventh aspect of the invention, there is provided a display, characterized in that any one of the first to sixth phase difference control components is located on a viewing side thereof.

According to the eighth aspect of the invention, there is provided an electroluminescence display, characterized in that any one of the first to sixth phase difference control components is located on a viewing side thereof.

According to the ninth aspect of the invention, there is provided a liquid crystal display, characterized in that any one of the first to sixth phase difference control components is located on a viewing side thereof.

Still other objects and advantages of the invention will in part be obvious and will in part be apparent from the specification.

The invention accordingly comprises the features of construction, combinations of elements, and arrangements of parts, which will be exemplified in the construction hereinafter set forth, and the scope of the invention will be indicated in the claims.

BRIEF DESCRIPTION OF THE DRAWINGS

FIG. 2 is illustrative of a phase difference control component that further comprises a color filter or the like.

DESCRIPTION OF THE PREFERRED EMBODIMENTS

Figure 1A:
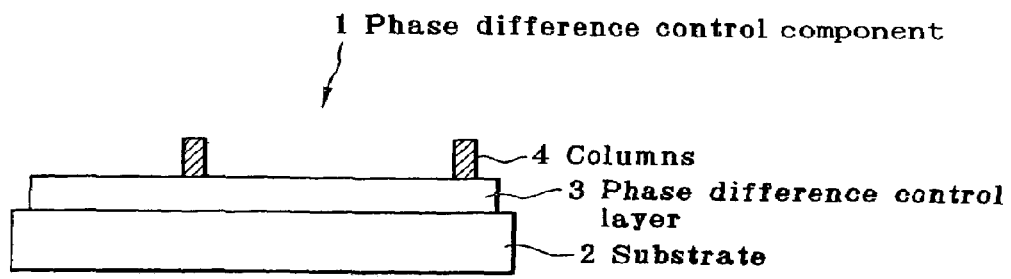
FIGS. 1(a), 1(b) and 1(c) are illustrative of phase difference control components having a plurality of columns.
Figure 1B:
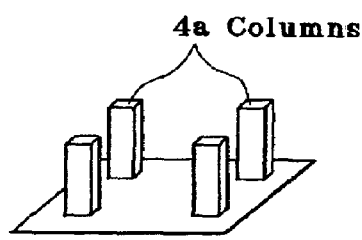
Figure 1C:
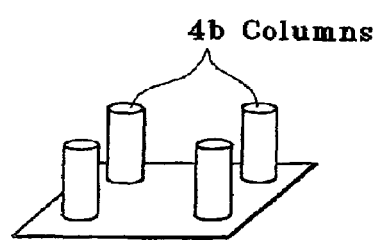

FIGS. 1(a), 1(b) and 1(c) are illustrative of some basic structures of the phase difference control component according to the invention. As shown in FIG. 1(a), a phase difference control component indicated generally at 1 comprises a multilayer structure wherein a phase difference control layer 3 composed of a liquid crystalline polymer is stacked on a preferably transparent substrate 2, and a plurality of columnar materials or members (columns) 4 are arranged on the phase difference control layer 3.

The term "liquid crystalline polymer" used herein is understood to refer to a polymer whose liquid crystal state is immobilized at room temperature. For instance, the liquid crystalline polymer includes a polymer type liquid crystal wherein liquid crystal monomers having polymerizable groups in their molecule structures are crosslinked, and cured while their optical anisotropy before crosslinking is kept intact, and a polymer type liquid crystal having a glass transition temperature, which is heated to a temperature equal to or higher than that glass transition temperature to yield a liquid crystal layer that is then cooled down to a temperature lower than that glass transition temperature to froze the liquid crystal structure.

Each column 4 may be either a prismatic column of rectangular shape in section (FIG. 1(b)) or a cylindrical column of circular shape in section (FIG. 1(c)). Besides, columns of polygonal, oval or other shapes in section may be used. Regardless of sectional shape, the column may have different or identical diameters at the lowermost end (on the substrate 2) and the uppermost end; the column may have a diameter that changes continuously or stepwise in its height direction. The column having such basic sectional shape may also be rounded at its corners or upper end.

The column 4 should preferably have a height of about 0.5 μm to about 10.0 μm, and a sectional area of about 25 μm² to about 2,500 μm². As the sectional area of the column 4 is below the lower limit of 25 μm² to the preferable range, the column 4 is likely to become insufficient in terms of strength and adhesion strength to the underlying layer, and at more than the upper limit of 2,500 μm², the relative magnitude of the sectional area of the column 4 to display's pixels increases, leading to adverse influences on the visibility of a matching pixel and, hence, on image visibility. It is noted that when the lower sectional area differs from the upper sectional area of the column 4, the sectional area of the column 4 is, by definition, given by the larger sectional area, and usually the lower sectional area in FIGS. 1(a)-1(c). The term "pixel" is here understood to refer to the smallest unit giving any one of a red, a green or a blue image subdivision. In this connection, an element made up of a set of one red pixel, one green pixel and one blue pixel is called a picture element.

Although the columns 4 may basically be arranged at random or regularly, it is preferable that the density of columns 4 is in the range of at most about one per pixel to at least about one per 27 pixels. When applied to a display, higher densities of columns render image visibility low, and lower densities of columns cause variations in the spacing between the phase difference control component 1 and the opposite substrate.

Figure 2:
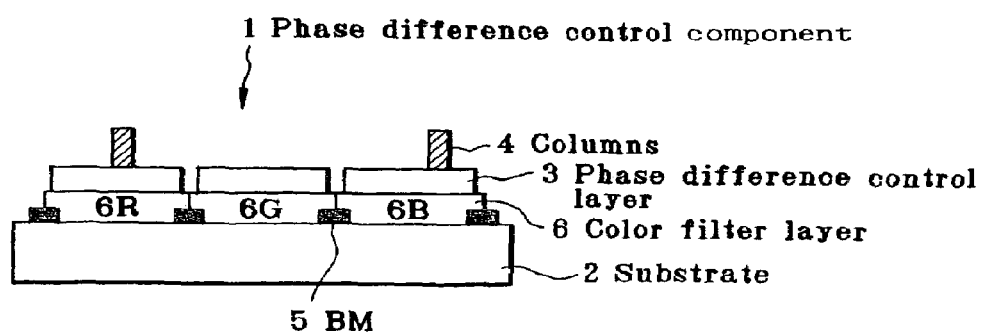

As shown in FIG. 2, the phase difference control component 1 of the invention may comprise on the substrate 2 various films ordinarily used in the art, in addition to the phase difference control layer 3 composed of a liquid crystalline polymer and the columns 4. For instance, a color filter layer 6 may be interposed between the substrate 2 and the phase difference control layer 3, and a black matrix 5BM may be interposed between the color filter layer 6 and the substrate 2. Although the color filter layer 6 is shown to lie below the phase difference control layer 3, it is understood that the color filter layer 6 may be placed on the phase difference control layer.

Although, in FIG. 1(a), the phase difference control layer 3 made up of a liquid crystalline polymer is shown to be uniformly and evenly stacked on the substrate 2, it is understood that the phase difference control layer 3 may be divided into color patterns that form the color filter layer 6, i.e., a red pattern (shown at 6R), a green pattern (shown at 6G) and a blue pattern (shown at 6B), as depicted in FIG. 2. As a matter of course, these color patterns may be dispensed with. When the phase difference control layer 3 is provided for each color pattern, the thickness of the phase difference control layer 3 may be varied depending on the underlying color patterns, i.e., the pixels. Thus, the phase difference control layer 3 is well fit for the application of a phase difference amount that is determined depending on the pixels, and practically on the light wavelength of the color to be subjected to phase difference control for each pixel. The phase difference control layer 3, whether it is a uniform, even layer or a patterned layer, may have a double-layer structure wherein two layers are stacked together in the vertical direction of FIG. 1(a). It is noted that when the phase difference control layer 3 has a double-layer structure, both layers may be stacked on the substrate 2, one on one side, and another on another side. Some embodiments wherein such various layer constructions are used together with the opposite substrates, etc. to set up liquid crystal displays are now explained with reference to the drawings.

Figure 3:
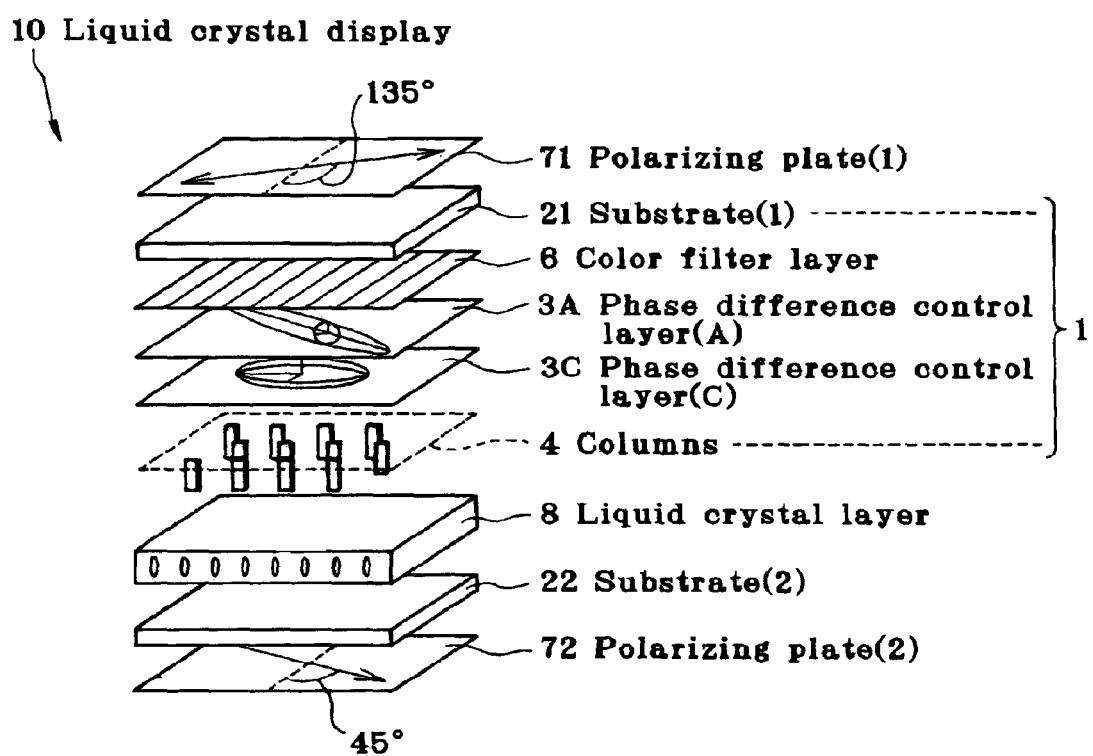
FIG. 3 is illustrative of the first exemplary application to a liquid crystal display.
Figure 4:
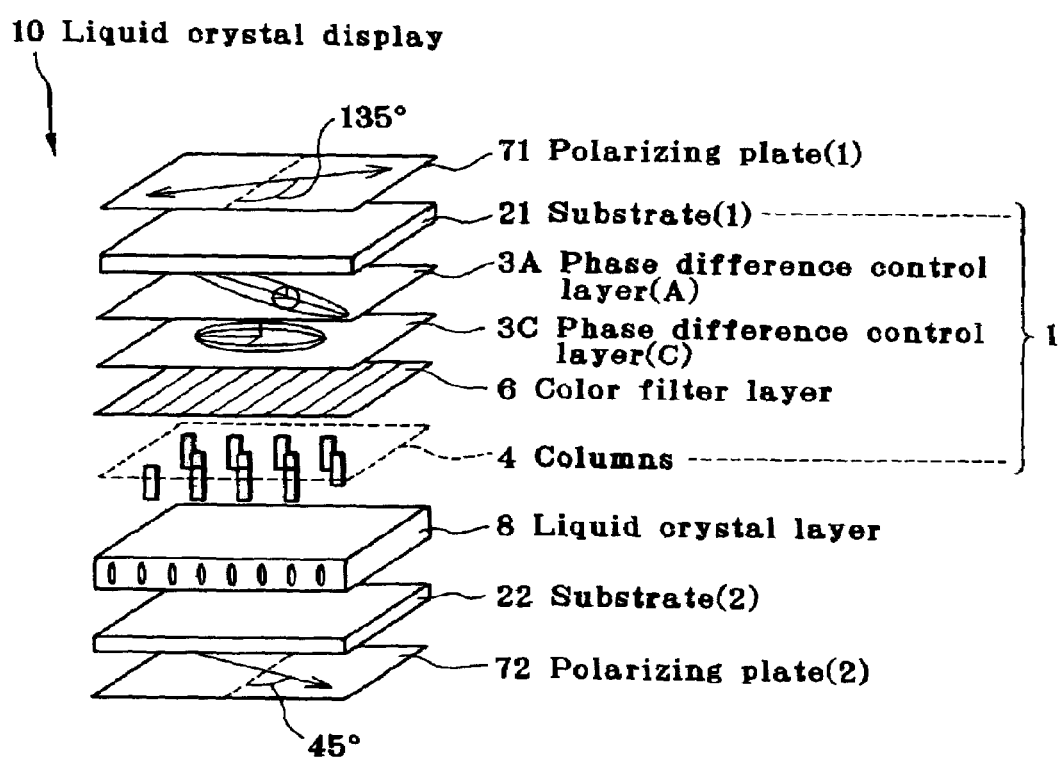
FIG. 4 is illustrative of the second exemplary application to a liquid crystal display.
Figure 5:
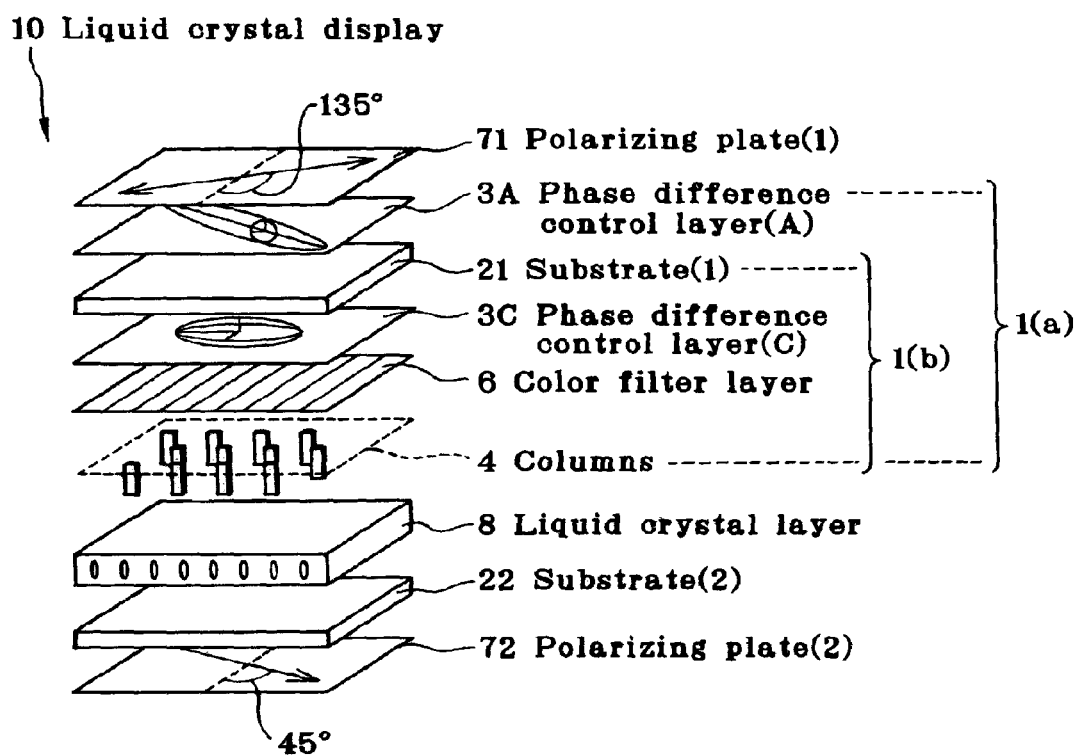
FIG. 5 is illustrative of the third exemplary application to a liquid crystal display.

FIG. 3, FIG. 4 and FIG. 5 are each illustrative in schematic of one exemplary construction of a transmission type liquid crystal display to which the phase difference control component 1 of the invention including a plurality of columns is applied.

A liquid crystal display 10 shown in FIG. 3 has a multilayer structure comprising, as viewed in order from a viewing side defined by an upper side of FIG. 3, one polarizing plate (1) 71, one substrate (1) 21 that is transparent, a color filter layer 6, a phase difference control layer (A) 3A, a phase difference control layer (C) 3C, a plurality of columns 4, a liquid crystal layer 8, an opposite substrate (2) 22 and another polarizing plate (2). This liquid crystal display 10 is of the transmission type that is viewable from its rear side defined by a lower side of FIG. 3. In the embodiment of FIG. 3, a phase difference control component 1 of the invention including a plurality of columns is given by a multilayer structure wherein the five layers, i.e., transparent substrate (1) 21, color filter layer 6, phase difference control layer (A) 3A, phase difference control layer (C) 3C and columns 4 are stacked together. It is here noted that FIGS. 3-8 are illustrative of the relative positions of the respective layers that are actually in contact with one another without such spaces as shown. Throughout the disclosure, the term "phase difference control layer (A)" refers to a layer with its optical axis lying horizontal thereto, and the term "phase difference control layer (C)" refers to a layer with its optical axis vertical thereto; however, the phase difference control layer used herein may have its optical axis at an angle therewith or have a specific hybrid orientation wherein that angle changes in the vertical direction to that layer.

Thus, the phase difference control component of the type wherein the phase difference control layers made up of a liquid crystalline polymer are stacked together has a feature of preventing reflection of light at a bonding interface found in a structure having a separate phase difference control component stacked on a substrate by way of an adhesive layer. Unless otherwise stated, this feature is common to all the embodiments shown in FIGS. 3-8. Stacking of the phase difference control layer uniformly all over the color filter layer 6 is not just effective at reducing thickness variations between the respective color patterns that form the color filter layer 6, but is also capable of preventing impurities from migrating from the color filter layer 6 toward the lower side of FIG. 3.

Although not shown, the phase difference control component 1 of the invention and the liquid crystal display 10 explained with reference to FIG. 3 are subjected to such ordinary processing as mentioned just below. First, it is preferable that the polarizing plates 71 and 72 are bonded onto the substrates (1) 21 and (2) 22, respectively, with adhesive layers applied between them. The substrates (1) 21 and (2) 22 are provided with electrodes on the opposite sides. When the electrode is provided on the color filter layer or the phase difference control layer, it should preferably be stacked thereon with a transparent resin protective layer or an inorganic transparent protective layer located between them. Both substrates (1) 21 and (2) 22 are sealed up at their peripheries while a narrow spacing is maintained by a plurality of columns 4, and a liquid crystal layer 8 consisting of liquid crystals is received in the thus sealed spacing. On electrodes on the surfaces coming in direct contact with the liquid crystal layer 8, that is, on electrodes on the opposite sides of the phase difference control layer (C) 3C and the substrate 2 (22) in the embodiment explained with reference to FIG. 3, alignment layers should preferably be provided. In each phase difference control layer, the underlying layer should preferably have an alignment layer. When two phase difference control layers are directly stacked for each phase difference control component, it is preferable that on the side of the second layer of the first phase difference control layer, which is the underlying layer of the second phase difference control layer, there should preferably be stacked a transparent resin protective layer and an alignment layer from the first phase difference control layer.

A liquid crystal display 10 of FIG. 4 is similar to the liquid crystal display 10 explained with reference to FIG. 3 except that the color filter layer 6 and both phase difference control layers (A) 3A and (C) 3C change places. Accordingly, a multilayer structure wherein five layers, i.e., transparent substrate (1) 21, phase difference control layer (A) 3A, phase difference control layer (C) 3C, color filter layer 6 and column array 4 are stacked together in this order provides a phase difference control component 1 of the invention including a plurality of columns 4.

To the phase difference control component of the type wherein the phase difference control layers each made up of a liquid crystalline polymer is stacked directly on the substrate (1) 21, the flatness of the substrate that is an underlying layer for the phase difference control layer makes a great contribution (usually, substrates used in these application fields are of excellent flatness). As a consequence, the thickness variations of the phase difference control layers are much more reduced with little variations in the phase difference control function. Since the phase difference control layer is covered up with the color filter layer 6, a deficiency of the surface rigidity of the phase difference control layer can be made up for by selection of the material of which the color filter layer 6 is formed.

A liquid crystal display 10 of FIG. 5 is similar to the liquid crystal display 10 explained with reference to FIG. 4 except that the phase difference control layer (A) 3A positioned just below the substrate (1) 21 is brought onto, and stacked, on the upper surface side of the substrate (1) 21. Accordingly, a multilayer structure wherein five layers, i.e., phase difference control layer (A) 3A, transparent substrate (1) 21, phase difference control layer (C) 3C, color filter 6 and column array 4 are stacked together in this order provides a phase difference control component 1 of the invention including a plurality of columns.

In the liquid crystal display explained with reference to FIG. 3 or FIG. 4, two phase difference control layers, i.e., the phase difference control layers (A) 3A and (C) 3C are directly stacked together, and so it is required to interpose a transparent resin protective layer and an alignment layer between two such layers. In the liquid crystal display 10 shown in FIG. 5, however, it is possible to make use of another multilayer structure wherein a layer made up of a liquid crystalline polymer is limited to the phase difference control layer (C) 3C alone, and a conventional retardation film (1) 21 that is not formed of any liquid crystalline polymer is stacked as the phase difference control layer (A) 3A on the viewing side of the substrate (1) 21. In this another multilayer structure, a structure wherein four layers, i.e., transparent substrate (1) 21, phase difference control layer (C) 3C, color filter 6 and column array 4 are stacked together in this order provides a phase difference control component 1 of the invention including a plurality of columns, because only one phase difference control layer is made up of a liquid crystalline polymer.

Figure 6:
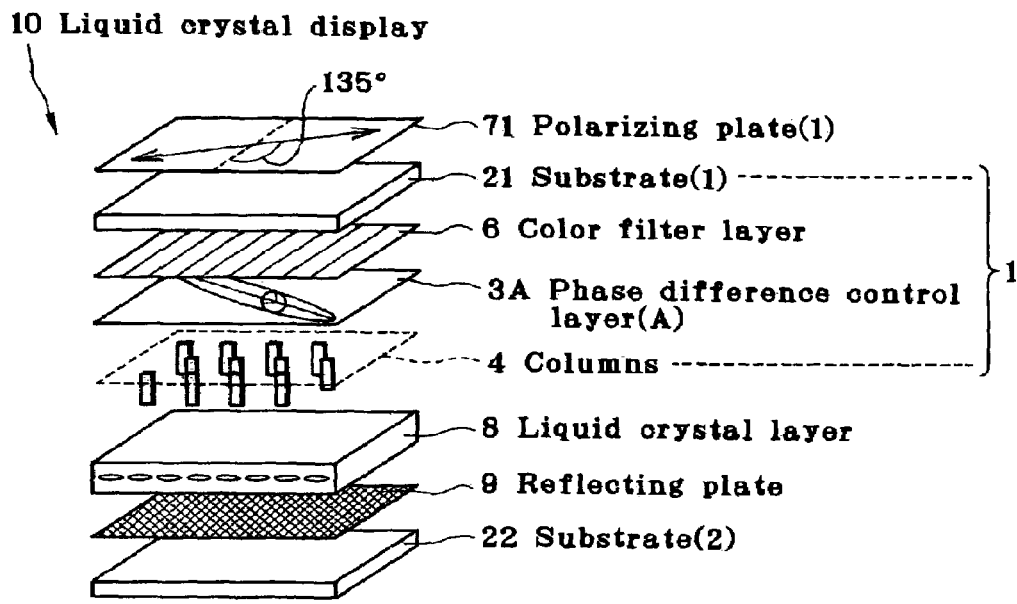
FIG. 6 is illustrative of the fourth exemplary application to a liquid crystal display.
Figure 7:
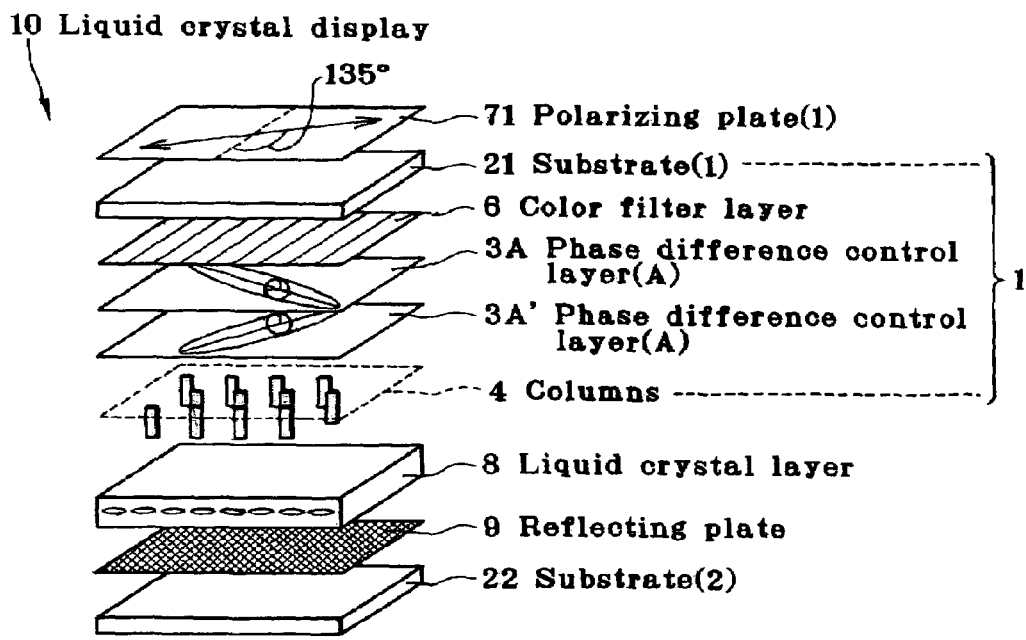
FIG. 7 is illustrative of the fifth exemplary application to a liquid crystal display.
Figure 8:
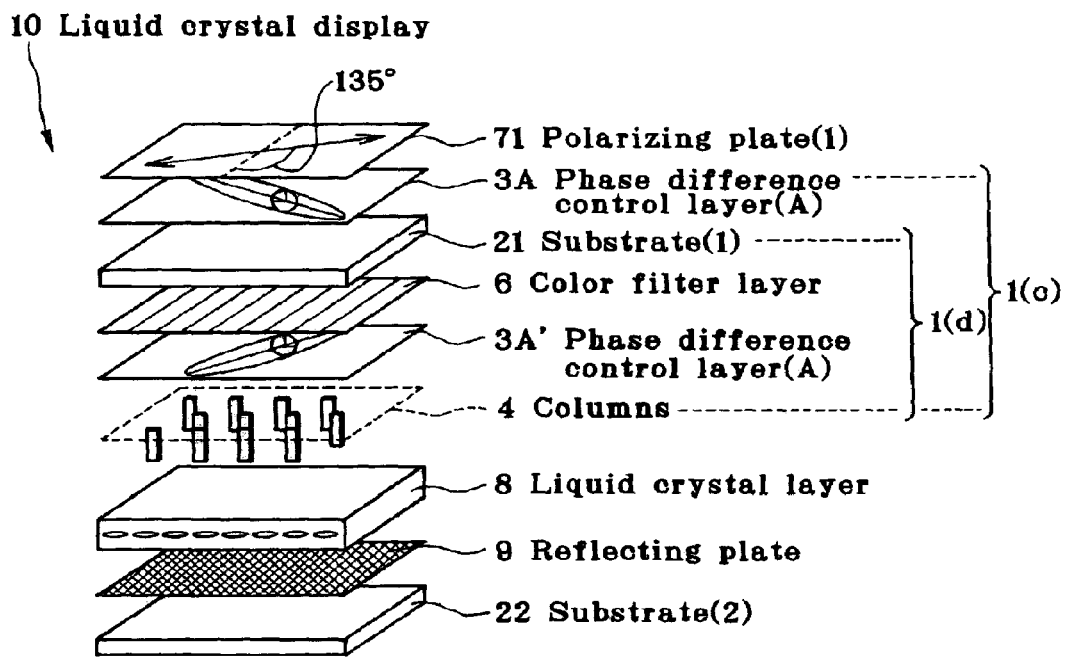
FIG. 8 is illustrative of the sixth exemplary application to a liquid crystal display.

FIG. 6, FIG. 7 and FIG. 8 are each illustrative in schematic of one exemplary construction of a reflection type liquid crystal display to which the phase difference control component 1 of the invention including a plurality of columns is applied.

A liquid crystal display 10 depicted in FIG. 6 has a structure wherein a polarizing plate (1) 71, one substrate (1) 21 that is transparent, a color filter layer 6, a phase difference control layer (A) 3A, a plurality of columns 4, a liquid crystal layer 8, a reflecting plate 9 and an opposite substrate (2) 22 are arranged and stacked together in order from a viewing side that is defined by an upper side of FIG. 6. The liquid crystal display 10 is viewable through illumination from that viewing side. The surface of the underlying layer in direct contact with the liquid crystal layer 8 provides the reflecting plate 9 explained with reference to FIG. 6, and so an alignment film is preferably formed on the upper surface side of the reflecting plate 9 depicted in FIG. 6. Accordingly, a multilayer structure wherein four layers, i.e., transparent substrate (1) 21, color filter layer 6, phase difference control layer (A) 3A and column array 4 are stacked together in this order provides a phase difference control component of the invention including a plurality of columns. It is noted that the color filter layer 6 and the phase difference control layer (A) 3A may change places. The phase difference control component explained with reference to FIG. 6 has the same advantages as those of the phase difference control component explained with reference to FIG. 3.

A liquid crystal display 10 depicted in FIG. 7 is similar to the liquid crystal display 10 of FIG. 6 except that two phase difference control layers, i.e., a phase difference control layer (A) 3A' and a phase difference control layer (A) 3A are stacked in this order on the side of a liquid crystal layer 8 that faces away from a substrate 2. Accordingly, a multilayer structure wherein five layers, i.e., transparent substrate (1) 21, color filter layer 6, phase difference control layer (A) 3A, phase difference control layer (A) 3A' and column array 4 are stacked in this order provides a phase difference control component of the invention including a plurality of columns. One advantage of this arrangement is that by appropriate determination of two such phase difference control layers, it is possible to hold back changes in the polarized state depending on wavelength and viewing angle.

A liquid crystal display 10 of FIG. 8 is similar to the liquid crystal display 10 explained with reference to FIG. 7 except that one phase difference control layer (A) 3A is brought onto, and stacked, on the upper surface side of the substrate (1) 21. Accordingly, a multilayer structure wherein five layers, i.e., phase difference control layer (A) 3A, transparent substrate (1) 21, color filter layer 6, phase difference control layer (A) 3A', and column array 4 are stacked together in this order provides a phase difference control component 1(*c*) of the invention including a plurality of columns.

In the liquid crystal display explained with reference to FIG. 7, two phase difference control layers, i.e., the phase difference control layers (A) 3A and (A) 3A' are directly stacked together, and so it is required to interpose a transparent resin protective layer and an alignment layer between two such layers. In the liquid crystal display 10 of the structure shown in FIG. 8, however, it is possible to make use of another multilayer structure wherein a layer made up of a liquid crystalline polymer is limited to the phase difference control layer (A) 3A' alone, and a conventional retardation film (1) 21 that is not formed of any liquid crystalline polymer is stacked as the phase difference control layer (A) 3A on the viewing side of the substrate (1) 21 with an adhesive layer between them. In this another multilayer structure, a structure wherein four layers, i.e., transparent substrate (1) 21, color filter layer 6, phase difference control layer (A) 3A' and column array 4 are stacked together in this order provides a phase difference control plate 1(*d*) of the invention including columns, because only one phase difference control layer is made up of a liquid crystalline polymer.

In the invention, the substrate (21 and 22) may be formed of inorganic materials such as glass, silicon and quartz or organic materials as listed below. That is, the organic materials include acrylics such as polymethyl methacrylate, polyamides, polyacetals, polybutylene terephthalates, polyethylene terephthalates, polyethylene naphthanates, triacetyl celluloses, syndiotactic polystyrenes, polyphenylene sulfides, polyether ketones, polyether ether ketones, fluororesins, polyether nitriles, polycarbonates, modified polyphenylene ethers, polycyclohexenes, polynorbornene resins, polysulfones, polyether sulfones, polysulfones, polyallylates, polyamide-imides, polyether imides, thermoplastic polyimides or the like. Generally available plastics may also be used. Although not critical to the invention, the thickness of the substrate 21, 22, for instance, may be on the order of 5 µm to 1 mm depending on purposes.

The black matrix 5 may be formed by applying a resin composition of the coating type containing a black coloring agent on one surface where it is temporarily cured, followed by processing with a photoresist, or coating, exposure and development using a photosensitive resin composition of the coating type containing a black coloring agent. Thus, the black matrix 5 may be formed of a black coloring agent-containing resin composition.

Alternatively, the black matrix 5 may be either a double-layer chromium black matrix having a multilayer structure of CrOx/Cr where x is an arbitrary number and / indicates a lamination or a triple-layer chromium black matrix having a multilayer structure of CrOx/CrNy/Cr where x and y are each an arbitrary number. Specifically, such a double- or triple chromium black matrix is provided in a thin-film form, optionally with a metal, metal oxide or metal nitride, by various processes such as ion plating or sputtering, and a thin film is then patterned by photolithography. Those matrixes may also be provided by means of electroless plating or a printing process using a black ink composition. The black matrix 5 may have a thickness of the order of 0.2 µm to 0.4 µm in a thin-film form, and of the order of 0.5 µm to 2 µm when prepared by printing.

While the color patterns of the color filter layer 6 are provided for each opening in the black matrix 5, it is understood that they may optionally be provided in a strip form extending from the front of FIG. 2 in the depth direction. The color filter layer 6 is formed of a resin composition in which a coloring agent is dissolved or dispersed, or preferably a finely divided pigment is dispersed. For instance, ink compositions colored in given colors are printed for each color pattern. However, it is more preferable that the color filter layer 6 is formed by photolithography using a photosensitive resin composition of the coating type containing a coloring agent of given color. The color filter layer 6 has a thickness on the order of 1 µm to 5 µm.

The color patterns that form the color filter layer 6 are usually provided at the same thickness; however, the thickness of the phase difference control layer provided corresponding to the color patterns varies with colors. Accordingly, when the phase difference control layer is provided on a color filter layer that has had color patterns of varying thicknesses, it is preferable that both the layers are provided in such a way that the total of the thickness of the color patterns and the thickness of the phase difference control layer is kept constant, thereby permitting the phase difference control layer to have an optimum value for each color pattern. When the color filter layer is provided with a thickness larger than usual, it is preferable to decrease the amount of the coloring agent added, and when provided with a thickness smaller than usual, it is preferable to increase the amount of the coloring agent added. Coating thickness may be controlled by changing the coating or printing conditions, or changing the viscosity of the coating or ink composition used.

Prior to providing the phase difference control layer 3 on the color filter layer 6, an alignment film for the phase difference control layer 3 is provided, if necessary. This alignment film is provided to line up the liquid crystalline polymer for forming the upper phase difference layer 3 in a given direction. The alignment film may be formed by coating and drying a resin composition with a polyamide or polyimide resin dissolved therein to form a resin coating film, and grubbing that resin coating film in a given direction using a cloth-wound roller or the like. It is noted that when two phase difference control layers are stacked together, it is preferable to interleave an alignment film between the first and the second layer. When the phase difference control layer 3 is stacked directly on the substrate 2, too, it is preferable to provide an alignment film.

The phase difference control layer 3 is formed of a material obtained by curing a polymerizable liquid crystal composition that contains a polymerizable liquid crystal compound. The phase difference control layer (A) referred to in the foregoing, that is, the phase difference control layer with its optical axis horizontal thereto may be formed by the polymerization of a polymerizable liquid crystalline monomer. Specifically, a photopolymerizable liquid crystal composition comprising a photopolymerization initiator incorporated in such a monomer is coated on an application surface, and then exposed to ultraviolet radiation or the like. The phase difference control layer (C), that is, the phase difference control layer having its optical axis vertical thereto and negative refractive index anisotropy may be formed in the same manner as mentioned above with the exception that a photopolymerizable liquid crystal composition having a polymerizable chiral agent incorporated therein is used.

For the polymerizable liquid crystal monomer, those known from JP(A)10-508882 may be used, and for the polymerizable chiral agent, those known from JP(A)7-258638 may be used. Specifically, the polymerizable liquid crystal monomer may be exemplified by the following structural formulae (1) and (11), and the polymerizable chiral agent may be exemplified by the following structural formulae (12) to (14).

Chemical Formula 1

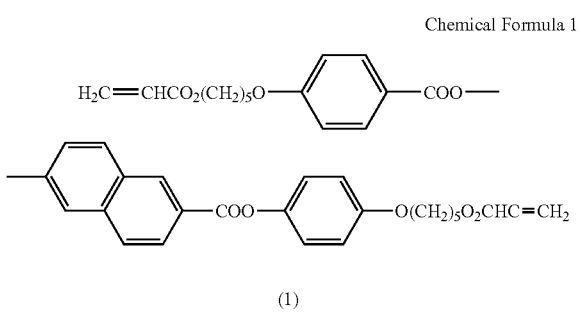

(1)

Chemical Formula 2

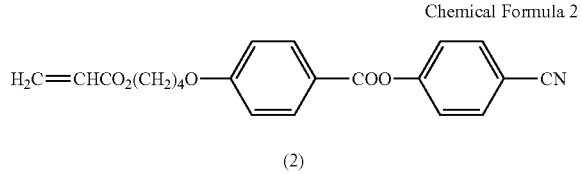

(2)

Chemical Formula 3

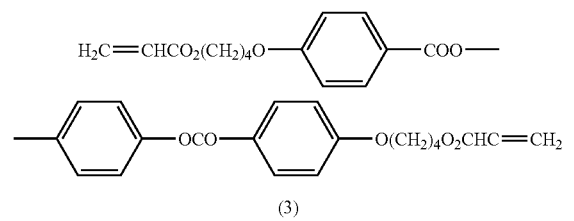

(3)

Chemical Formula 4

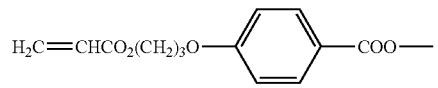

Chemical Formula 5

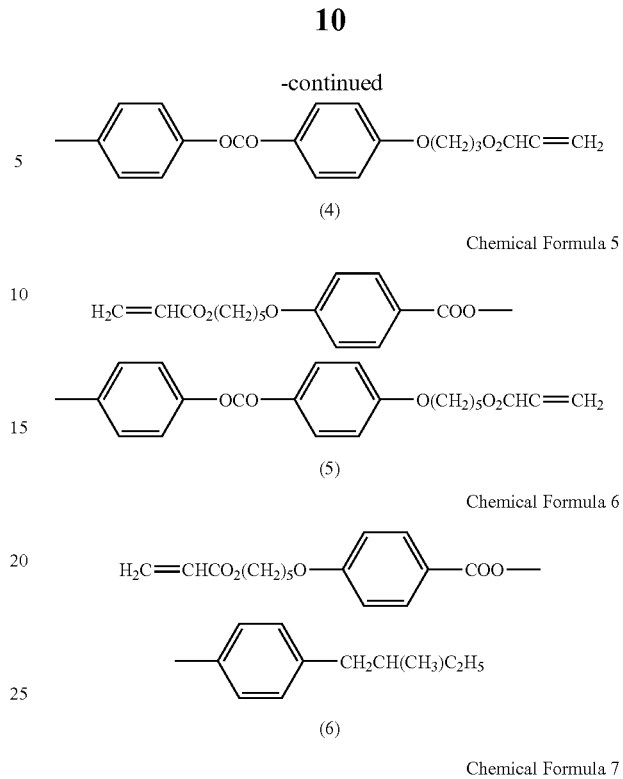

(4)

(5)

Chemical Formula 6

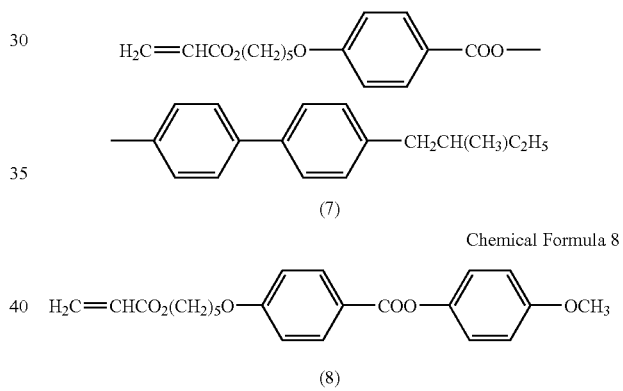

(6)

Chemical Formula 7

(7)

Chemical Formula 8

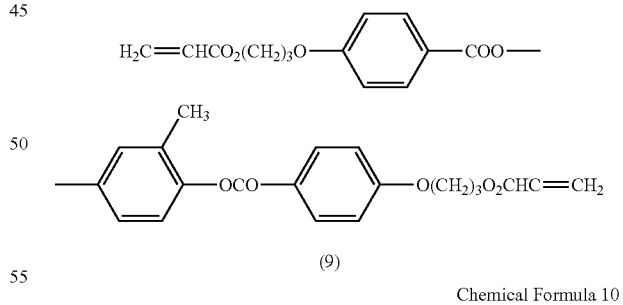

(8)

Chemical Formula 9

(9)

Chemical Formula 10

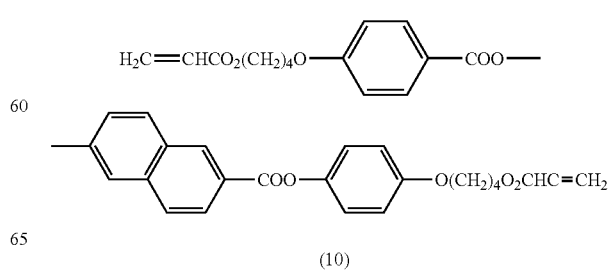

(10)

Chemical Formula 11

$H_2C=CHCO_2(CH_2)_aOCOO$—⟨phenyl⟩—$COO$—

(11) ⟨methylphenyl⟩—$OCO$—⟨phenyl⟩—$OOCO(CH_2)_bO_2CHC=CH_2$

Chemical Formula 12

(12) binaphthyl—$OCOYO(CH_2)_cOCOCH_2$R (both positions)

Chemical Formula 13

(13) binaphthyl—$OCOYO(CH_2)_dCH_3$ (both positions)

Chemical Formula 14

$H_2C=CHCO_2(CH_2)_eOCOO$—⟨phenyl⟩—$COO$—⟨phenyl⟩—

(14) ⟨phenyl⟩—$OOC$—⟨phenyl⟩—$OOCO(H_2C)_eO_2CHC=CH_2$

Chemical Formula 15

(i), (ii), (iii), (iv), (v)

(vi), (vii), (viii), (ix), (x), (xi), (xii), (xiii), (xiv), (xv), (xvi), (xvii)

Chemical Formula 16

(xviii), (xix)

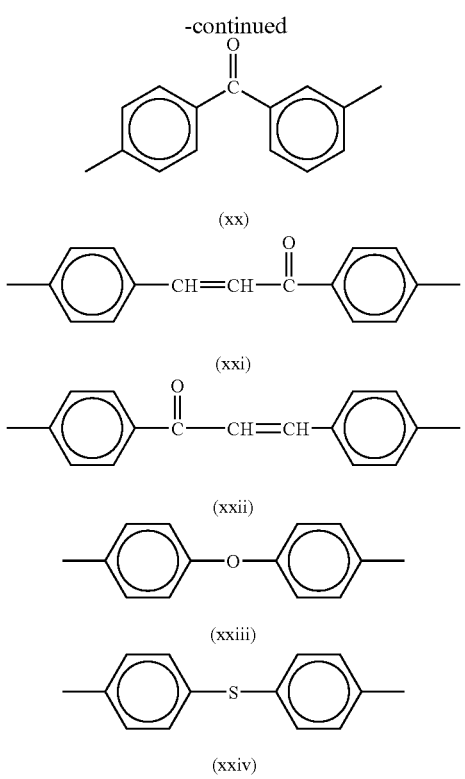

In structural formulae (11) to (14), small letters a, b, c, d and e indicative of the number of methylene groups (the chain lengths of alkylene groups) are each an integer. Small letters a and b are each independently 2 to 12, preferably 4 to 10, and more preferably 6 to 9; c and d are each independently 2 to 12, preferably 4 to 10, and more preferably 6 to 9; and e is 2 to 5. A capital Y in structure formulae (12) and (13) is any one of formulae (i) to (xxiv) in groups (15) and (16), and preferably formula (I), (ii), (iii), (v) or (vii).

To provide the phase difference control layer 3 on the color filter layer 6, such a photopolymerizable liquid crystal composition, optionally dissolved in or diluted by a solvent, is coated on the color filter layer 6 by means of spin coating, die coating, slit coating or other suitable processes, and then polymerized by ultraviolet irradiation.

Only one requirement for the phase difference control layer 3 is to permit it to sit on the color patterns that form the color filter 6; the aforesaid exposure process is carried out by such a pattern exposure that only the necessary places are left behind, so that the phase difference control layer 3 can be stacked on only an effective display area that receives the color filter layer 6, the black matrix 5 and so on, with nothing on the peripheral edge of the substrate 2. If the phase difference control layer 3 is stacked in place in this way while the peripheral edge of the substrate 2 remains exposed, it is then possible to ensure that a sealing material is applied on the exposed peripheral edge of the substrate 2, when the phase difference control component of the invention including a plurality of columns is applied to a liquid crystal display.

Each column 4 may be formed of various materials; in view of strength, however, that should preferably be formed of a material obtained by curing a curable resin. In consideration of the ability to locate the column 4 of given size in given place, the column 4 should preferably be formed of a cured material of a photosensitive resin composition, and broadly a cured material of an ionizing radiation-curable resin composition. Specifically, the ionizing radiation-curable resin is processed, if required, as a mixture with a solvent, a diluent, a monomer or the like and, optionally, with additives into a coating or ink composition for preparing columns. This composition is then processed by means of a photo-process (photolithography) involving coating, drying, given pattern exposure and development. In this way, the desired column 4 may be obtained. Alternatively, the column 4 may be obtained by a printing process or the like suitable for thick coating, if required, followed by multiple printing. While the invention will be explained exclusively with reference to the photosensitive resin composition, it is understood that materials cured by irradiation with electron radiation other than ultraviolet radiation could also be used.

For the formation of the column 4, the photosensitive resin composition is coated on an application surface to a given thickness, if required, followed by preliminary curing. Subsequently, the coating is exposed to light in a given pattern using a mask or the like, and then developed. Thus, the column 4 formed of the organic material is well compatible with other layers, and preferably for this photosensitive resin composition, compositions containing a photosensitive resin having a reactive vinyl group such as a resin based on acrylate, methacrylate, polycinnamic acid or cyclized rubber are used. The photosensitive resin composition generates relatively less heat to an application member. It is noted that the column 4 could also be formed of an inorganic material such as silicon oxide or silicon. Although a large amount of heat is required for the formation of such an inorganic column, it has some merits of being well compatible with an inorganic substrate such as a glass substrate and free from solvent or other bleeding.

When the column 4 is formed of an inorganic material, it is preferable that a film is formed by vapor phase growth such as vapor deposition or sputtering, and then patterned by photolithography.

When the phase difference control component of the invention comprises the color filter layer 6 as explained with reference to FIG. 2, a plurality of columns 4 may be formed using an exclusive material. Alternatively, photosensitive resin compositions for forming the red, green and blue divisions that provide the color filter layer 6 may be used to provide a plurality of columns 4 by photolithography. Specifically, at least two or three of the photosensitive resin compositions for forming the red, green and blue divisions are put one upon another in the thickness direction to obtain a plurality of columns 4 having the desired sufficient thickness. This enables material and process steps to be much more saved as compared with the use of the exclusive material. It is noted that a plurality of higher columns 4 could be provided on the black matrix 5.

While the phase difference control component of the invention having a plurality of columns has been described specifically with reference to the liquid crystal display, especially the color liquid crystal display, it is understood that the phase difference control component of the invention may also be applied to a self-emission type display such as an organic EL display, a field emission display or a plasma display.

Figure 10:
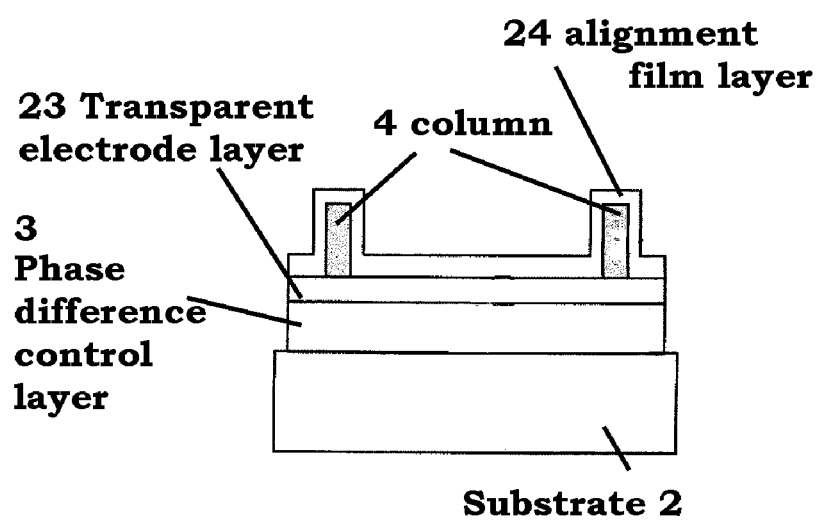
FIG. 10 is illustrative of order of stacking relative to phase difference control layer in an embodiment.

As shown in FIG. 10, the phase difference control component 1 of the invention may comprise on the substrate 2 a phase difference control layer 3, a transparent electrode layer 23, columns 4 and alignment film layer 24.

EXAMPLES

Photosensitive resin compositions (hereinafter called photoresists) for forming the black matrix and the color patterns for the color filter layer provided on the substrate were prepared. Each photoresist was prepared by mixing a resist composition comprising polymers, monomers, additives, initiators and solvents with a dispersion obtained by dispersing together pigments, dispersants and solvents plus beads for 3 hours using a paint shaker as a dispersing machine and removing the beads from the resulting dispersion. Each photoresist was composed of the following ingredients in the following parts given on a weight basis.

Black Matrix-Formation Photoresist

| | |
|---|---|
| Black Pigment (TM Black #9550 made by Dainichi Seika Co., Ltd.) | 14.0 parts |
| Dispersant (Disperbick 111 made by Big Chemy Co., Ltd. | 1.2 parts |
| Polymer ((Meth)Acrylic Resin Product No. VR60 made by Showa Kobunshi Co., Ltd.) | 2.8 parts |
| Monomer (Polyfunctional Acrylate Product No. SR399 made by Sartomer Co., Ltd.) | 3.5 parts |
| Additive (Dispersion Improver; Chemistory L-20 Soken Kagaku Co., Ltd.) | 0.7 part |
| Initiator (2-benzyl-2-dimethylamino-1-(4-morpholinophenyl)-butaonone) | 1.6 parts |
| Initiator (4,4'-diethylaminobenzophenone) | 0.3 part |
| Initiator (2,4-diethylthioxanthone) | 0.1 part |
| Solvent (Ethylene Glycol Monobutyl Ether) | 75.8 parts |

Red Pattern-Formation Photoresist

| | |
|---|---|
| Red Pigment (C.I. PR254) (Chromophthal DPP Red BP made by Chiba Specialty Chemicals Co., Ltd) | 3.5 parts |
| Yellow Pigment (C.I. PY139) (Paliotol Yellow D1819 made by BASF) | 0.6 part |
| Dispersant (Solperse 24000 made by Zeneca Co., Ltd.) | 3.0 parts |
| Polymer 1* | 5.0 parts |
| Monomer (Polyfunctional Acrylate Product No. SR399 made by Sartomer Co., Ltd.) | 4.0 parts |
| Initiator (Irgacure 907 made by Chiba Specialty Chemicals Co., Ltd.) | 1.4 parts |
| Initiator (2,2-bis(o-chlorophenyl)-4,5,4',5'-tetraphenyl-1,2'-bisimidazole) | 0.6 part |
| Solvent (Propylene Glycol Monomethyl Ether Acetate) | 80.0 parts |

Polymer 1* is an adduct of 16.9 mol % of 2-methacryloyloxyethyl isocyanate to 100 mol % of a copolymer of benzyl methacrylate:styrene:acrylic acid:2-hydroxymethyl methacrylate = 15.6:37.0:30.5:16.9 (molar ratio), with a weight-average molecular weight of 42,500.

Green Pattern-Formation Photoresist

This photoresist was prepared with the same ingredients as in the red pattern-formation photoresist with the exception that instead of the red and yellow pigments, the following pigments were used in the amounts specified below.

| | |
|---|---|
| Green Pigment (C.I. PG7) (Seika Fast Green 5316P made by Dainichi Seika Co., Ltd.) | 3.7 parts |
| Yellow Pigment (C.I. PY139) (Paliotol Yellow D1819 made by BASF Co., Ltd.) | 2.3 parts |

Blue Pattern-Formation Photoresist

This photoresist was prepared with the same ingredients as in the red pattern-formation photoresist with the exception that instead of the red pigment, yellow pigment and dispersant, the following ingredients were used in the amounts specified below.

| | |
|---|---|
| Blue Pigment (C.I. PB15:6) (Heliogenble L6700F made by BASF Co., Ltd.) | 4.6 parts |
| Purple Pigment (C.I. PV23) (Fosterperm RL-NF made by Clariant Co., Ltd.) | 1.4 parts |
| Pigment Derivative (Solperse 12000 made by Zeneca Co., Ltd.) | 0.6 part |
| Dispersant (Solperse 24000 made by Zeneca Co., Ltd.) | 2.4 parts |

A molten process borosilicate thin-sheet glass having a thickness of 0.7 mm (Product No. 7059 made by Coning Co., Ltd., U.S.A.) was provided as a substrate. After the substrate was washed, a black matrix-formation photoresist was coated thereon by spin coating, after which the coating was prebaked at a temperature of 90° C. for a heating time of 3 minutes. Then, the prebaked coating was exposed to a given pattern of ultraviolet radiation at an irradiation dose of 100 mJ/cm$^2$. After that exposure, spray development was carried out for 60 seconds using a 0.05% aqueous solution of KOH. Finally, post-baking was performed at a temperature of 200° C. for a heating time of 30 minutes to form a 1.2-μm thick black matrix having openings corresponding to pixels.

Then, a red pattern-formation photoresist was spin coated on the black matrix provided on the substrate, after which the coating was prebaked at a temperature of 80° C. for a heating time of 5 minutes. Then, the prebaked coating was subjected to alignment exposure in a given pattern at an irradiation dose of 300 mJ/cm$^2$. After that exposure, spray development was carried out for 60 seconds using a 0.1% aqueous solution of KOH. Finally, post-baking was performed at a temperature of 200° C. for a heating time of 60 minutes to form a 2.6-μm red pattern at positions corresponding to the given openings in the black matrix.

Subsequently, a green pattern-formation photoresist and a blue pattern-formation photoresist were used as was the case with the red pattern-formation photoresist to form a 2.6-μm thick green pattern and a 2.6-μm thick blue pattern. In this way, the red, green and blue patterns were formed in alignment with the positions of different openings in the black matrix to make a color filter layer with red, green and blue three-color patterns formed in alignment.

An alignment film-formation ink composition of polyimide resin (Product No. AL1254 made by JSR Co., Ltd.) was pattern printed on the necessary site on the color filter layer on the black matrix on the substrate by means of flexographic printing. After that printing, the pattern was dried for solvent removal, and then fired at a temperature of 200° C. for a heating time of 1 hour, after which the fired pattern was rubbed at the surface to form an alignment film of 700 Å in thickness.

Photosensitive resin compositions (A) and (C) were prepared for the formation of phase difference control layers (A) and (C). The photosensitive resin composition (A) was prepared by mixing 75 parts of a liquid crystal material having a mesogen at its center, polymerizable acrylate groups at both its terminals and a spacer between the center mesogen and the terminal acrylate groups with 1 part of a photopolymerization initiator (1-hydroxycyclohexyl phenyl ketone; Irgacure 184 made by Chiba Specialty Chemicals Co., Ltd.) and 25 parts of a solvent toluene, and the photosensitive resin composition (C) was prepared by mixing a composition similar to the photosensitive resin composition (A) with 5 parts of a chiral material having polymerizable acrylate groups at both its terminals.

The photosensitive resin composition (A) for the formation of the phase difference control layer was spin coated on the alignment film, after which the assembly including the substrate was placed on a hot plate where it was heated at a temperature of 100° C. for a heating time of 5 minutes for solvent removal to allow the coating to grow a liquid crystal structure therein. After this, pattern exposure was carried out with a 365-nm wavelength ultraviolet radiation at an irradiation dose of 10 J/cm$^2$, and development was done using a methanol developing solution to form a 1.0-μm thick phase difference control layer (A) on the green pattern on the color filter layer. The same steps were repeated with the exception that the mask openings were displaced during pattern exposure to form a 1.3-μm thick phase difference control layer (A) on the red pattern and a 0.75-μm thick phase difference control layer (A) on the blue pattern.

Subsequently, the photosensitive resin composition (C) was used as was used as in the case of the formation of the phase difference control layer (A) to form a 2.5-μm thick phase difference control layer (C) on the phase difference control layer (A) on the green pattern of the color filter layer. The same steps were repeated with the exception that the mask openings were displaced during pattern exposure to form a 2.3-μm thick phase difference control layer (C) on the phase difference control layer (A) on the red pattern and a 2.7-μm thick phase difference control layer (C) on the phase difference control layer (A) on the blue pattern.

An ultraviolet curing type of overcoat-formation coating composition with an acrylic resin used as a binder resin was coated on a division with the phase difference control layers (A) and (C) arranged in order, and then dried on a hot plate for solvent removal. Subsequently, pattern exposure was then done using a photomask, and development was done for removal of unexposed regions, after which post-baking was effected to form an overcoat layer of 1.2 μm in thickness. Finally, a 2,000-Å thick ITO (indium tin oxide) thin film was formed as a common electrode on the thus formed overcoat layer by means of sputtering.

An ultraviolet curable, transparent negative type resist was coated on the thus formed ITO thin film, and then subjected to pattern exposure and development, thereby forming a plurality of columns having a height of 4.5 μm and an ITO thin film-side bottom area of 100 μm$^2$ at a proportion of 1 per 240 μm×240 μm. After the formation of the columns, a pattern form of polyimide resin-based alignment agent (JALS2021 made by JSR Co., Ltd.) was applied by flexographic printing on a division with the phase difference control layers (A) and (C) as well as the columns formed thereon, and then fired at a temperature of 200° C. for 1 hour to form a 700-Å thick vertical alignment film. In this way, a phase difference control component having a plurality of columns was obtained.

An opposite substrate was obtained by successively providing the same ITO thin film and vertical alignment film on the same substrate by the same process as described above. This opposite substrate was put on the above phase difference control component having a plurality of columns with the vertical alignment films opposite to each other, and the peripheral edges of the assembly were then bonded together and sealed up to form a square cell having an internal size of 10 cm×10 cm. A liquid crystal having negative dielectric anisotropy (Product No. MLC6608 made by Merck & Co., Inc.) was injected and sealed up in that cell by means of vacuum injection. Finally, after-annealing was carried out at a temperature of 110° C. for 1 hours for cancellation in the flowing direction, thereby obtaining a liquid crystal cell.

COMPARATIVE EXAMPLE

A comparative liquid crystal cell was obtained as in the examples with the exception that a phase difference control component prepared with no columns provided thereon was placed on an opposite substrate wherein 4.5-μm diameter spacer beads (Micropearl made by Sekisui Chemical Co., Ltd.) were spotted over an alignment film.

Figure 9:
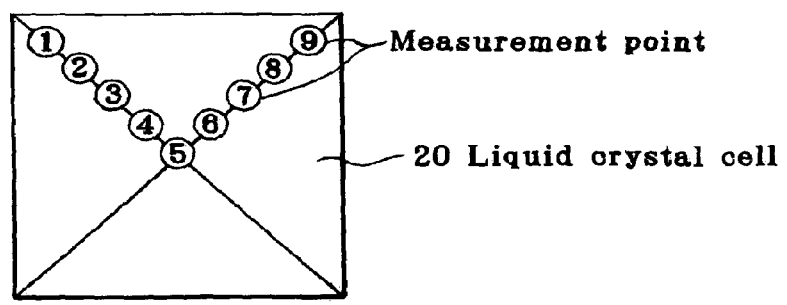
FIG. 9 is illustrative of the positions of cell gaps to be measured in one specific embodiment.

An LCD cell gap-measurement system (Product No. MCPD2000 made by Otsuka Electronics Co., Ltd.) was used to measure cell gaps (liquid crystal layer thickness) regarding the inventive and comparative liquid crystal cells obtained as described above. The values in μm of cell gaps measured per 1.4 cm in directions from the point of intersection of diagonals of the square contour of the cell along the diagonals toward the upper side of FIG. 9 are given in Table 1. It is noted that the encircled numbers 1 to 9 in Table 1 correspond to the encircled numbers in FIG. 9.

TABLE 1

|  | ① | ② | ③ | ④ | ⑤ |
|---|---|---|---|---|---|
| Inventive | 4.208 | 4.202 | 4.216 | 4.214 | 4.217 |
| Comparative | 4.441 | 4.214 | 4.256 | 4.450 | 4.430 |

|  | ⑥ | ⑦ | ⑧ | ⑨ |
|---|---|---|---|---|
| Inventive | 4.211 | 4.220 | 4.207 | 4.204 |
| Comparative | 4.411 | 4.220 | 4.314 | 4.330 |

As can be seen from Table 1, the largest and smallest cell gap values in the inventive example are 4.220 μm and 4.202 μm, respectively; the difference between the largest and the smallest is as small as 0.018 μm, whereas the largest and smallest cell gap values in the comparative example are 4.450 μm and 4.214 μm, respectively; the difference between the largest and the smallest is as large as 0.236 μm.

The first aspect of the invention can provide a phase difference control component that makes it easy to set the spacing between opposite substrates at a predetermined value and reduce variations in that spacing without causing spacer particles to engaging in a phase difference control layer as found in the prior art, because a plurality of columns stacked on that phase difference control layer and formed of a material obtained by curing an ionizing radiation-curable resin composition is utilized for the purpose of limiting the spacing between opposite substrates.

The second aspect of the invention can provide a phase difference control component that has not just the advantage of the first aspect of the invention but also can maintain strength and image visibility when applied to a display, because each column is predetermined in terms of sectional area and height.

The third aspect of the invention can provide a phase difference control component that has not just the advantage of the first or second aspect of the invention, but can also reduce variations in image visibility and the spacing between opposite substrates, because the density of columns is defined in terms of the number of pixels.

The fourth aspect of the invention can provide a phase difference control component that has not just the advantage of the first, second or third aspect of the invention, but is also well suited for giving a different amount of phase difference for each pixel, because the phase difference control layer is provided for each pixel.

The fifth aspect of the invention can provide a phase difference control component that has not just the advantage of any one of the first to fourth aspects of the invention, but can also make chromatic correction, because the color filter layer is provided.

The sixth aspect of the invention can provide a phase difference control component that enables a liquid crystal layer to be immediately interposed between opposite substrates, because a transparent electrode layer and an alignment layer are stacked on the phase difference control layer in this order.

The seventh aspect of the invention can provide a display that makes the most of the advantage of any one of the phase difference control components according to the $1^{st}$ to $6^{th}$ aspects of the invention.

The eighth aspect of the invention can provide an electroluminescence display that makes the most of the advantage of any one of the phase difference control components according to the $1^{st}$ to $6^{th}$ aspects of the invention.

The ninth aspect of the invention can provide a liquid crystal display that makes the most of the advantage of any one of the phase difference control components according to the $1^{st}$ to $6^{th}$ aspects of the invention.

I claim:

1. A phase difference control member adapted to be employed in a display cell, comprising a substrate, a phase difference control layer and columns, wherein said phase difference control layer has a first face that is stacked on said substrate and comprises a liquid crystalline polymer, and said columns are provided at a second face of said phase difference control layer and formed of a material obtained by curing an ionizing radiation-curable resin composition, wherein said second face of said phase difference control member is opposite said first face of said phase difference control layer that is stacked on said substrate and said second face side is adapted to be oriented toward a display component when assembled in the display cell, further comprising a color filter layer is interposed between said substrate and said phase difference control layer or on a side of said phase difference control layer that faces away from said substrate.

2. The phase difference control member according to claim 1, further comprising each column has a sectional area of 25 $\mu m^2$ to 2,500 $\mu m^2$ and a height of 0.5 $\mu m$ to 10.0 $\mu m$.

3. The phase difference control member according to claim 1 or 2, further comprising when said phase difference control component is used to construct a display comprising a plurality of pixels, columns formed on the phase difference layer are such that one column is provided per 1 to 27 of said pixels.

4. The phase difference control member according to claim 1 or 2, further comprising that as viewed in order from said phase difference control layer on said substrate, a transparent electrode layer and an alignment film are stacked on the phase difference control layer in the noted order and, wherein said columns and said alignment layer are both stacked on said transparent electrode layer.

5. A display, comprising that the phase difference control member according to claim 1 or 2 is located on a viewing side thereof.

6. A liquid crystal display, comprising that the phase difference control member according to claim 1 or 2 is located on a viewing side thereof.

* * * * *